Aug. 5, 1930.  F. W. HOCHSTETTER  1,772,081
PROCESS AND APPARATUS FOR TREATING DERIVATIVES OF AQUEOUS
CELLULOSE COMPOUNDS FOR USE IN PHOTOGRAPHIC AND
ITS ALLIED ARTS AND OTHER USEFUL PURPOSES
Filed Aug. 27, 1927   2 Sheets-Sheet 1

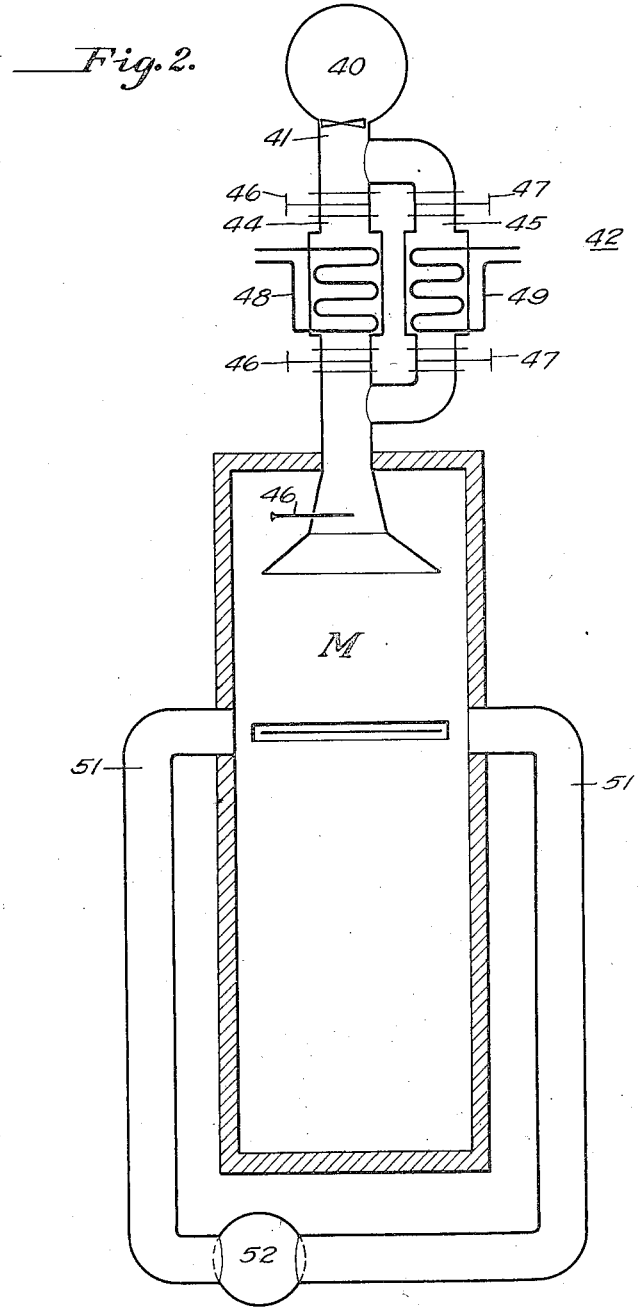

Patented Aug. 5, 1930

1,772,081

UNITED STATES PATENT OFFICE

FREDERICK W. HOCHSTETTER, OF PITTSBURGH, PENNSYLVANIA

PROCESS AND APPARATUS FOR TREATING DERIVATIVES OF AQUEOUS CELLULOSE COMPOUNDS FOR USE IN PHOTOGRAPHIC AND ITS ALLIED ARTS AND OTHER USEFUL PURPOSES

Application filed August 27, 1927. Serial No. 215,846.

This invention relates to the process and apparatus for treating derivatives of aqueous cellulose films, sheets, webs, etc. and more particularly for rendering such films, sheets, webs, etc. non-inflammable, water resisting and moisture proof.

Derivatives of aqueous cellulose materials are much cheaper than the nitro and acetate cellulose materials that are now generally used for making films, webs, etc. for use in photographic and other arts. Many attempts have been made to produce satisfactory films from aqueous cellulose materials of viscose derivatives which have not been successful. Such films become brittle and useless in a short time and when subjected to heat and light when projecting said film the product becomes entirely dehydrated. Also when such films are subjected to the photographic processes the films are readily attacked by the alkali and acid baths causing contraction of the films thus producing distorted images.

An object of this invention is to provide a process and apparatus for treating derivatives from the cellulose, sulpho, and carbonate (viscose) xanthates, cupro ammonium cellulose and other well known aqueous cellulose compounds, thus rendering such materials free from attack by alkali and acids such as used in the well known processes for developing and fixing photographic films.

Another object of this invention is to provide a process and apparatus for treating derivatives of aqueous cellulose compounds that will render them water resisting, non-shrinkable and non-inflammable for use in the photographic and allied arts and other useful purposes in place of the nitro or acetate cellulose compounds now generally used.

Another object of this invention is to provide a process and apparatus for treating films, webs and materials derived from cellulose sulphocarbonate (viscose) and other well known aqueous cellulose compounds for making them useful in the photographic and allied arts, for use as negatives and positives which will not be attacked by water or the various alkali or acid solutions in the art such as photographic developers, fixing baths, etc.

Another object of this invention is to provide films, webs, etc. for use in photographic and allied arts having the above characteristics and that shall have the necessary flexibility and strength in accordance with the standard requirement for use in motion pictures.

Another object of this invention is to produce a product for the purposes above stated at much lower cost than the well known nitro and acetate cellulose films now used in the arts by omitting expensive solvents and producing this product in one continuous operation.

Another object of this invention is to provide films, webs, etc. of aqueous cellulose for use in photographic and allied arts having its surfaces treated with compositions of matter, various temperatures, strong light and gas that shall cause such films, webs, etc. to repel and resist cold or hot water, reasonably strong acids and alkali solutions and at the same time absorb and combine with any good substratum for the purpose of forming a union with photographic emulsions or sensitizing compounds.

In practicing this invention, I first subject the film, web or sheet of aqueous cellulose derivative to a chamber containing steam vapor for rendering the medium absorbent; then subject it to a chamber having a lower temperature, then into a chamber having an increased temperature and subject it to a composition of matter, the components of which will hereinafter be explained. The medium is then conveyed into a chamber having a lower temperature, then into a chamber of higher temperature, and then into a plurality of chambers wherein the temperature of each consecutive chamber is decreased for the purpose of evaporation and setting. Then the medium is conveyed through a plurality of chambers in which the temperature of each consecutive chamber is raised for the purpose of further evaporating and driving the medium. The medium is then passed into a chamber of still higher temperature than that to which it was last subjected and at the same time subjected to a composition of matter for making it non-inflammable. Then the medium is conveyed through a plurality of chambers of different temperatures for the purpose of evaporating and drying, then into a chamber of higher temperature and treated with a composition of matter sensitive to light, such composition of matter when exposed to light causes the medium to become substantially water resisting. The medium is then passed through a chamber having a lower temperature than the last mentioned chamber for the purpose of evaporation and then conveyed through an illuminated chamber of a higher temperature for the purpose of further evaporating and exposing to light. While the medium is still in a plastic state, it is conveyed into a further chamber and exposed to stronger light and at the same time fumigated with formaldehyde gas, or any other suitable vapor or solution capable of imparting non-absorbent characteristics to colloidal, gelatinous or glutinous compounds and dried. Then the medium is conveyed through heated contact rollers into another chamber and subjected again to strong light at which time it is rendered free from attack by water, alkali and the well known acids used in the photographic processes as well as non-inflammable. The medium is then conveyed through the well known calendering method onto a rewind take-up roll.

As an example of the apparatus I employ for this process, reference is made to the drawings wherein, Fig. 1 is a side elevational view of the apparatus having the side cover removed, and, Fig. 2 is an enlarged sectional view taken along the line 2—2 of Fig. 1 showing the temperature control mechanism embodying a part of the invention.

As stated above, the films, webs, sheets, etc., of aqueous cellulose derivatives are treated with three different compounds together with the subjecting of the medium to steam vapor, various temperatures, fumigation and strong light.

The several compounds and the preferable components are given below in the order that they are applied to the medium and for the sake of simplicity will be referred to hereafter as compounds A, B and C.

Compound A consists in the separately mixing of three different compounded mixtures after which time the several mixtures are compounded together in the order in which they are given.

1. 100 grams gelatine soaked in 2000 cc. of distilled water until gelatine is swelled. The gelatine is then relieved of excess water and melted in a hot water bath after which is added, at a temperature of 120° F., 2,250 cc. 10% solution ammonium bromide, under constant stirring. When the temperature has reached 130° F., 100 cc. 10% solution of sodium chloride is added; and when the temperature has reached 140° F., 10 cc. 10% solution of potassium iodide is added under constant stirring. When the temperature is again raised till it reaches 150° F., 100 cc. 15% solution glycerine is added. The mixture, when it has reached the temperature of 160° F., is taken out of the hot water bath and the temperature permitted to drop to 110° F.

2. To 200 cc. distilled water, 50 grams gelatine, which has been thoroughly washed, is added and melted and when raised to a temperature of 120° F., 250 cc. 10% solution potassium alum is added, followed by 50 cc. solution of citric acid, 250 cc. grain alcohol, 250 cc. 10% solution phenol (carbolic acid) and thymol, or their equivalent.

3. 1,000 cc. distilled water and 250 cc. 10% solution chrome alum are combined at a temperature not exceeding 96° F. The mixtures may be filtered either before or after compounding together. The compound is then reduced to 90° F. at which time 250 cc. 10% solution of soap bark (tannin) is added.

The compound is then ready for application to the medium which is to be treated.

The second compound, or compound B, consists of the following components and is mixed in the sequence given, at a temperature of 160° F.

2,000 cc. distilled water, 500 cc. ammonium carbonate (5% solution), 500 cc. magnesium sulphate (5% solution), 500 cc. potassium alum (5% solution), 4,000 cc. meta gelatine (2% solution). (Meta gelatine consists of 4,000 cc. water and 2% gelatine which has been boiled for two hours.)

The third compound, or compound C, is mixed in a dark room in the manner given and consists of the following components. This compound is digested for a half hour at the temperature of 110° F. before applying to the medium.

2,500 cc. gelatine solution of a consistency of 1 B'mé to which is added 2,500 cc. of a 5% solution of potassium bi-chromate or ammonium bi-chromate or both in equal proportions, the color of which has been reduced to pale yellow by the addition of strong ammonia.

In the drawings, 1 is a supply roll containing the medium to be treated and is positioned in a chamber D containing steam vapor for rendering the medium absorbent. 2 is a contact roll and 3 is a tension roll for guiding the strip. The medium is then conveyed into a chamber E having a temperature of approximately 70° F. for the purpose of chilling, over a tension roll 4, then into a chamber F having a temperature of approximately 85° F. and subjected to compound A. The medium is conveyed into the compound A container by means of the feed roll 5 and around the idle rolls 6 disposed in the container.

The medium is conveyed out of the container through adjustable squeeze rolls 7—7 for the purpose of relieving the medium of excess compound, over guide roll 8 and onto an air suction perforated apron 9, the apron being supported by rolls 11 and 12 and provided with any suitable air suction apparatus (not shown). The apron 9 serves to draw the medium from the feed roll 1. The medium is then conveyed out of the chamber F back into the chamber E where the temperature is approximately 70° F. for the purpose of evaporating, into chamber G of a slightly higher temperature of approximately 75° F., into a chamber H of a slightly lower temperature of approximately 65° F. and then into chamber I having a still lower temperature of approximately 60° F. for the purpose of further evaporating and setting the compound A.

The medium is then conveyed into a chamber J having a temperature of approximately 70° F., then into a chamber K having a temperature of approximately 75° F., then into a chamber L having a temperature of approximately 80° F. and then into a chamber M having a temperature of approximately 85° F. for the purpose of finally evaporating and drying the medium.

The medium is then conveyed by the feed rolls 13—13, which serve to draw the medium through the various compartments, into a chamber N having a still higher temperature of approximately 95° F., then subjected to compound B, being guided through the compound by means of the rolls 14, then conveyed through feed rolls 15 which serve to draw the medium through the compound into a chamber O having a reduced temperature of approximately 85° F. and onto a second air suction perforated apron carried by rolls 16 and 17 and provided with any suitable air suction apparatus (not shown). Then the medium is conveyed into a chamber P having a temperature of approximately 90° F., through a pair of feed rolls 18, under the tension roll 19, between rolls 20 and under roll 21 for the purpose of evaporating and drying the medium.

The medium is then conveyed through feed roll 22—22 into a chamber Q having a temperature of approximately 95° F. and subjected to compound C for the purpose of making the medium sensitive to light. The medium is then conveyed through the compound C by means of rolls 23, then between feed rolls 24 and into a chamber R having a temperature of approximately 85° F., then through feed rolls 25 and into a chamber S having a higher temperature of approximately 90° F., and exposed to light. The medium is conveyed under guide roll 26, over guide roll 27 and under guide roll 28 for the purpose of drying.

The medium is then passed through feed rolls 29 and into chamber T where it is subjected to the action of strong light imparted by illuminating means 31 and at the same time fumigated. The medium is then passed into a chamber U, through feed rolls 32 and again subjected to strong light by suitable illuminating means 33, conveyed out of the chamber U around and between calender rolls 34 and finally onto a rewind or take-up roll 35.

The chamber T is provided at its bottom with a gas generating chamber V for supplying the formaldehyde gas or any other suitable gas, vapor or solution capable of imparting non-absorbent characteristics to the medium, and is also provided at its top with a suitable means W for exhausting the used gas etc.

The various chambers are conditioned by feeding thereto air which has been conditioned and regulated to the desired temperature. The apparatus is provided with a main air supply duct 40 having auxiliary air ducts 41 connecting each of the chambers with the main supply duct 40. The air supplied from the main air duct 40 is conditioned in a manner well known in industrial plants. This air is freed from all foreign matter and is delivered to the main air duct 40 by a suitable apparatus (not shown).

Each of the auxiliary air ducts 41 is provided with a temperature regulating device, represented in its entirety by 42 (see Fig. 2). The auxiliary air ducts 41 are provided with air passages 44 and 45. The air is directed and regulated through either or both of the passages by a suitable means such as shown at 46 and 47.

The air passage 44 is provided with a suitable heating coil such as shown at 48 for heating the air as it passes from the main air duct 40 into its associated chamber. The air passage 45 is provided with a suitable refrigerating coil 49 for cooling the air that is to be delivered therethrough to its associated chamber to a predetermined temperature.

Since Fig. 2 is an enlarged sectional view taken along the line 2—2 of Fig. 1, it illustrates a section through chamber M showing the connection of the heat regulating apparatus 42 thereto. Each of the various chambers are also provided with auxiliary exhaust pipes 51 which are connected to a main exhaust pipe 52 for relieving the chambers of the used air.

It can be seen from the above that the temperature in any of the chambers may be regulated to any predetermined degree and the chambers may be so conditioned as to subject a medium passing through the apparatus to different temperature which is very important in the treating process. The subjecting of the medium being treated to different temperatures hastens the conditioning of the surface of the medium as it passes from one compound to another and enables the medium to receive a plurality of treatments in one operation and thereby greatly reduces the expense in providing the finished product as well as increases the production thereof.

Another very important advantage obtained from this process which is believed by me to be new and novel is the subjecting of the medium to a combination of strong light and fumigation. Experiment clearly shows that this treatment renders the medium free from attack by water, alkali and the well known acid solutions used in the photographic processes and more satisfactory than mediums heretofore furnished.

I do not desire to confine this invention to the particular components of the compounds that are mentioned above because other suitable substances may be used if they have equivalent qualities. The temperatures stated above are preferred temperatures but it should be understood that fairly satisfactory results may be obtained even though the temperatures mentioned are varied.

It will readily be understood also, that I have described the course of treatment given to a single strip and have merely illustrated the apparatus for such treatment. The apparatus may be designed for conveying a plurality of strips through the process described at the same time, the strips being placed in parallel relation either side by side or one above the other. The case of a single strip is typical of the treatment given to all.

While I have illustrated and described but one embodiment of this invention it will be apparent to those skilled in the art that certain changes, modifications, substitutions, additions and omissions may be made in the process and apparatus described without departing from the spirit and scope of the appended claims.

What I claim as new and desire to secure by Letters Patent is:

1. In a process for water proofing a medium derived from aqueous cellulose compounds, the steps of rendering said medium absorbent, subjecting said medium to a gelatinous water proofing compound at 85° F., reducing the temperature of said medium to 60° F., increasing the temperature of said medium to 95° F., subjecting the said medium to a combination of formaldehyde gas and strong light, subjecting said medium to strong light the second time and pressing said medium.

2. In a process for making photographic films from a medium derived from aqueous cellulose compounds. the steps of rendering the said medium absorbent, subjecting the said medium to compound A, drying said medium, subjecting said medium to compound B, drying said medium, subjecting said medium to compound C, drying said medium, subjecting said medium to a combination of formaldehyde gas and strong light and pressing the same.

3. In a process of making films from a medium derived from aqueous cellulose compounds for use in the photographic art, rendering said medium absorbent, the steps of subjecting said medium to refrigeration, subjecting said medium to a gelatinous water proofing compound at a temperature of 85° F., reducing the temperature of said medium to about 70° F., increasing the temperature of said medium to about 75° F., subjecting the said medium to a temperature of from 65° F., to 95° F., subjecting said medium to a gelatinous compound for rendering it non-inflammable, reducing the temperature of said medium, drying said medium, subjecting said medium to a combination of strong light and gas and reducing the temperature of said medium to normal.

4. In a process for making water, alkali and acid proof photographic film bases derived from aqueous cellulose compound, the steps of subjecting the medium to a glutinous compound, subjecting the said medium to a gelatinous non-inflammable compound, subjecting the said medium to a light sensitive compound, and exposing the said medium to the combination of strong light and formaldehyde gas.

5. In a process for making a non-inflammable, water, acid and alkali resisting film base derived from aqueous cellulose compounds the steps of subjecting the medium successively to a gelatinous colloidal coating, a gelatinous non-inflamable solution and a light-sensitive bichromate solution at different temperatures, exposing the thus treated medium to light and further exposing said medium to light in combination with formaldehyde gas.

6. In a process for producing a water, alkali and acid resisting film base derived from a suitable aqueous cellulose compound, the steps of subjecting the medium to a coating of a composition of matter containing colloidal gelatin, including antiseptics, subjecting the medium to the action of a composition of matter having such characteristics as will impart non-inflammability to the said medium, subjecting the said coated medium to the action of a light sensitive compound and exposing the said medium to light.

7. In a process for making non-inflammable, water, alkali and acid proof films, sheets and webs derived from a suitable aqueous cellulose compound having sufficient flexibility and strength for use in the photographic and allied arts the steps of subjecting the said medium to a gelatinous adhesive-like compound having such characteristics as will combine with the aqueous cellulose derivative and become integral therewith, subjecting the said medium to a gelatinous composition of matter having such characteristics as will render the said medium non-inflammable, subjecting the said medium to a light sensitive compound, then subjecting the said medium to the action of formaldehyde gas and strong light.

In testimony whereof, I have hereunto subscribed my name this 18th day of August, 1927.

FREDERICK W. HOCHSTETTER.